Oct. 12, 1948. J. B. COOPER ET AL 2,450,881
PRESSURE CABIN CONTROLS
Filed Oct. 18, 1941 6 Sheets-Sheet 4

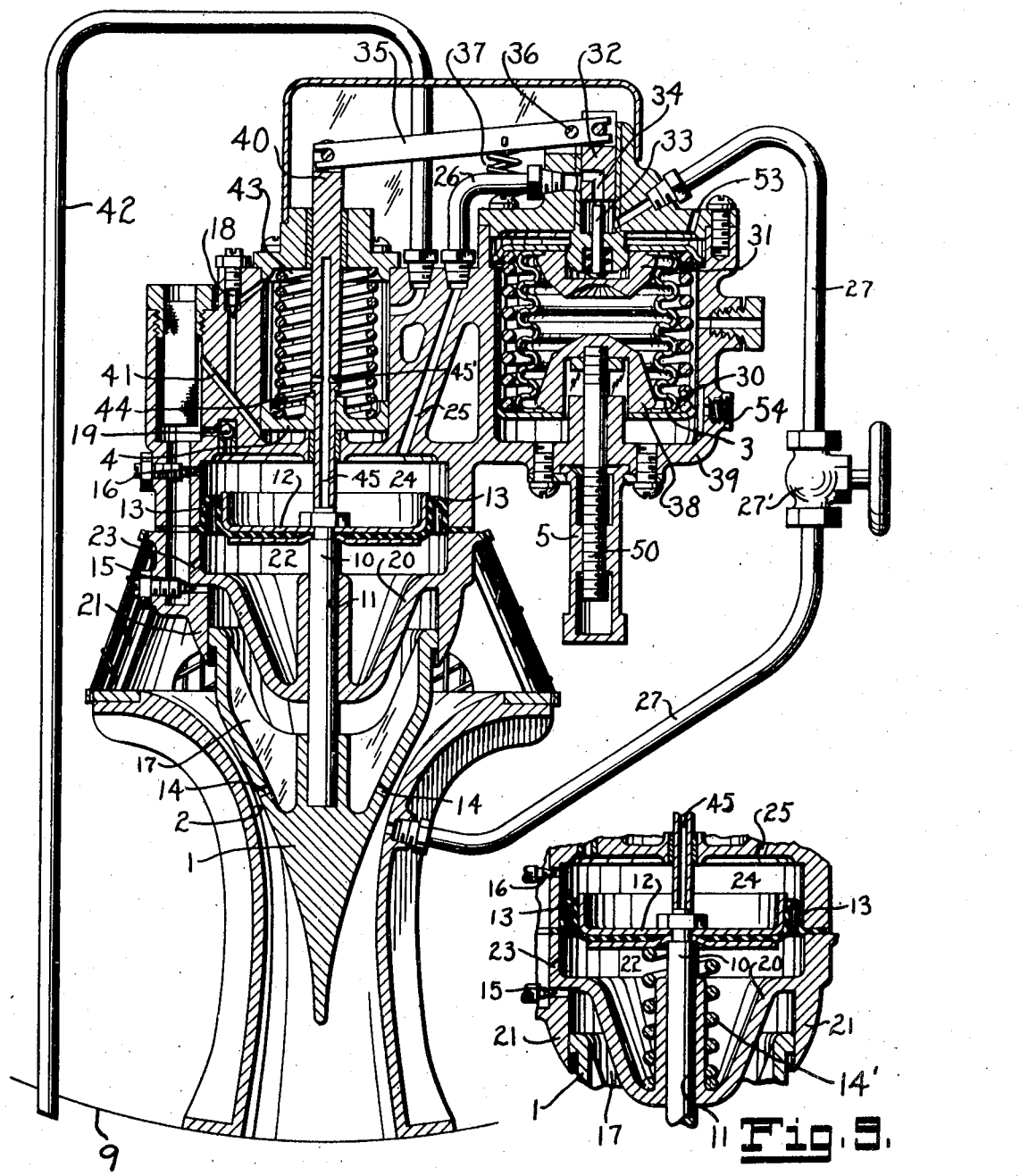

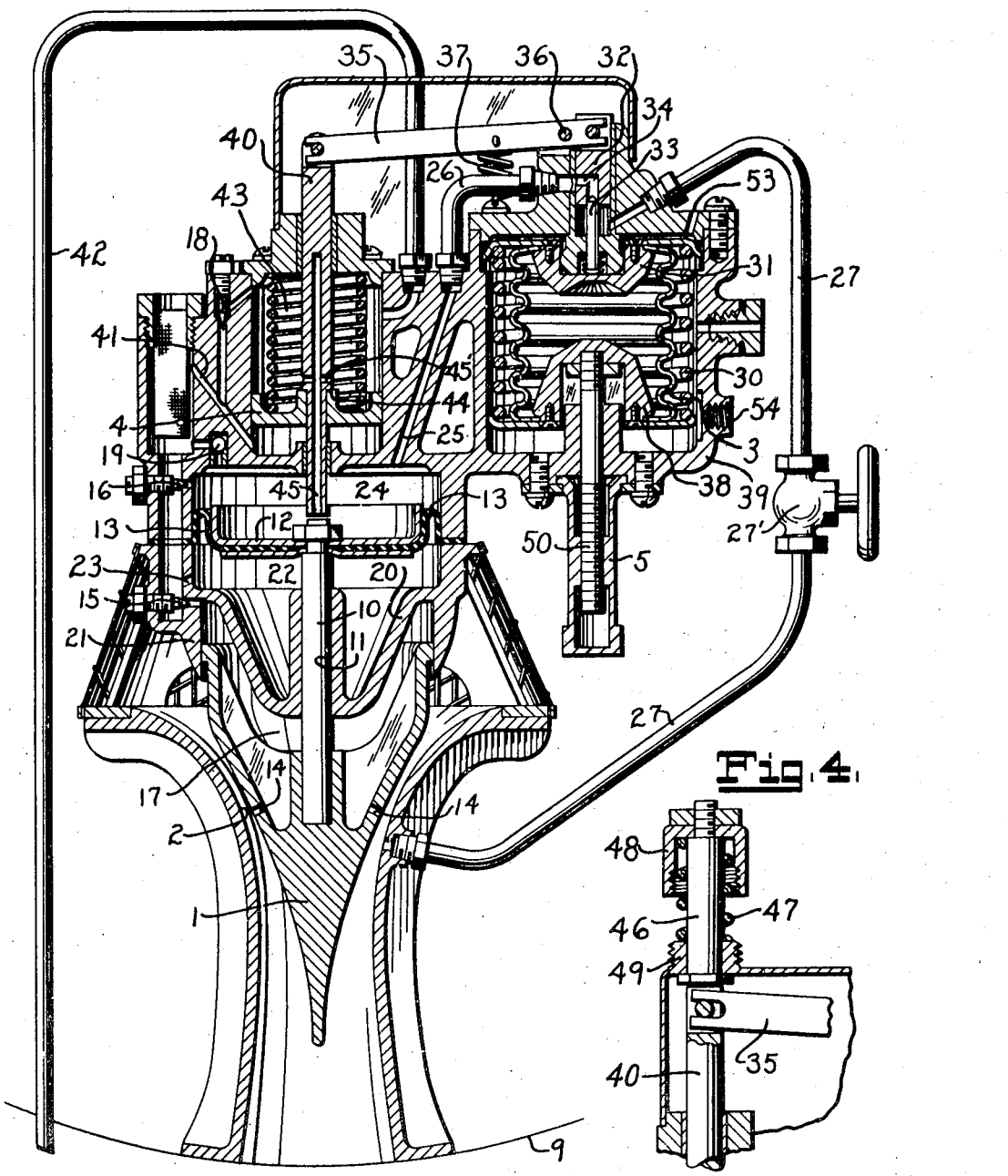

Inventors
James B. Cooper
Alfred B. Jepson
By Reynolds+Beach
Attorneys

Oct. 12, 1948.  J. B. COOPER ET AL  2,450,881
PRESSURE CABIN CONTROLS
Filed Oct. 18, 1941  6 Sheets-Sheet 5
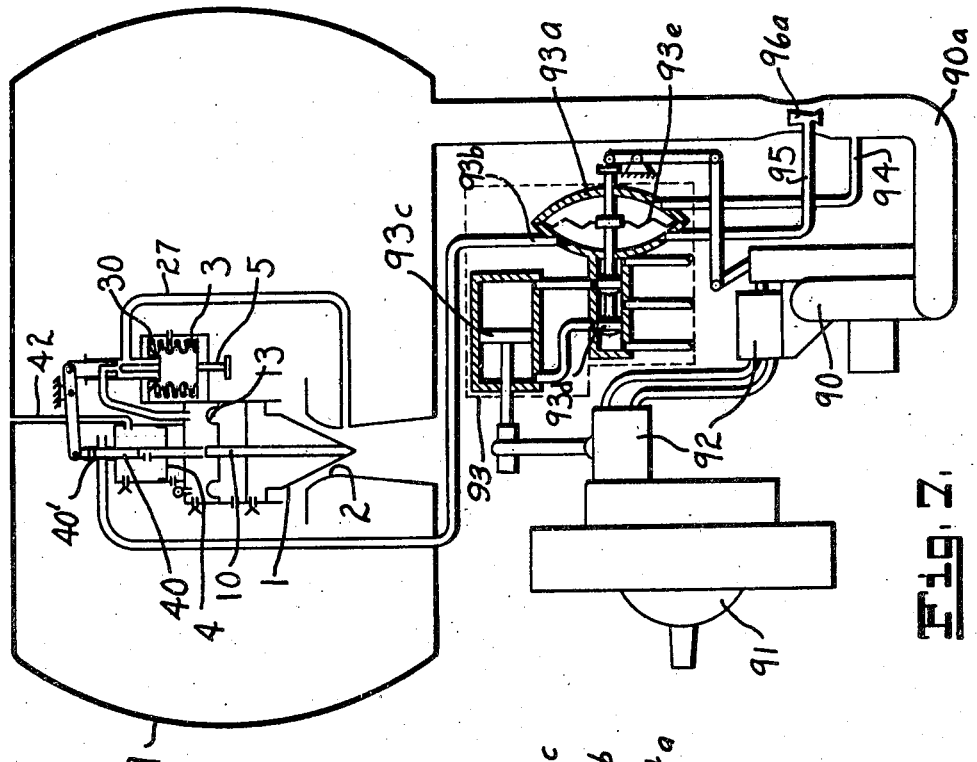
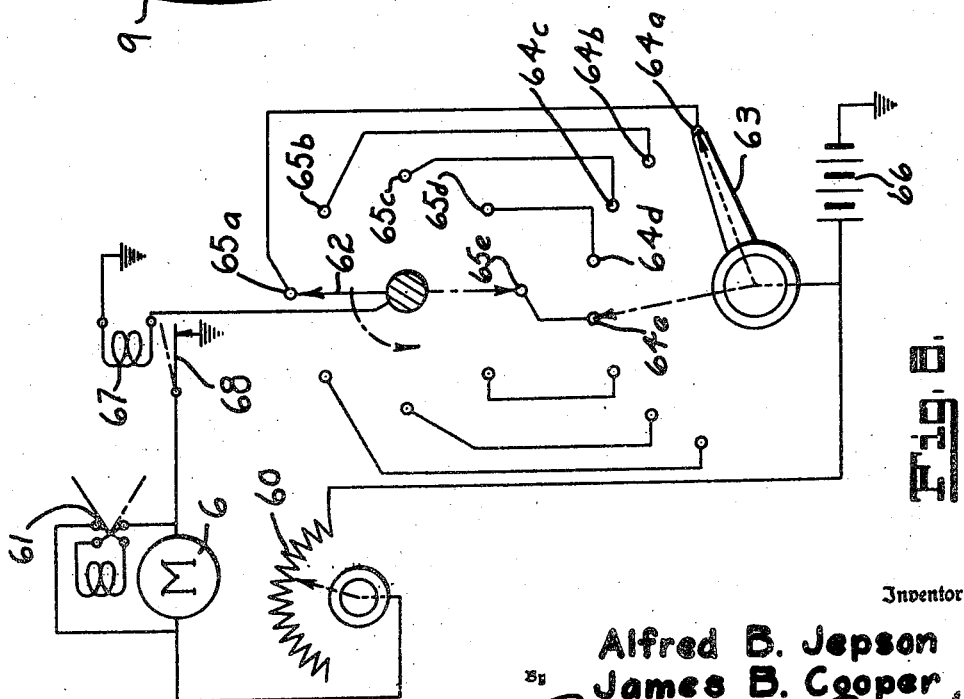
Inventors
Alfred B. Jepson
James B. Cooper
By Reynolds & Beach
Attorneys Pressure-Altitude Relationship Inventors
James B. Cooper
Alfred B. Jepson
Reynolds Beach
Attorneys Patented Oct. 12, 1948

2,450,881

UNITED STATES PATENT OFFICE 2,450,881

PRESSURE CABIN CONTROL

James B. Cooper and Alfred B. Jepson, Seattle, Wash., assignors to Boeing Airplane Company, a corporation of Delaware Application October 18, 1941, Serial No. 415,602

10 Claims. (Cl. 98—1.5)

RELATION TO OTHER DEVICES

The patent to N. C. Price, Reissue 22,272, issued February 16, 1943, discloses a pressure control system and a pressure control device intended to regulate the pressure within an aircraft cabin. In the physical form adopted for illustration in that Price patent, an inflow valve and an outflow valve were employed, with interconnecting controls affecting each of the valves, these controls including an absolute-pressure responsive device which regulated the cabin pressure from a reasonably low altitude up to a higher altitude, and the reverse, and a differential-pressure responsive device sensitive to the differential of cabin pressure over external pressure, and operable in such a way as always to prevent that differential from exceeding a fixed value.

The present device is in the nature of a refinement of the system disclosed in the aforementioned Price patent, and relates more particularly to a control device operable to regulate outflow from the cabin. It is intended for use in conjunction with other devices which operate to supply air under pressure within the cabin. These other devices may be so operated as to regulate the amount or vary the pressure of the air which is supplied to the cabin, in accordance with altitude or pressure conditions. The present device may operate (see Figure 6) wholly independently of the pressure-supplying means, or (see Figure 7) it may be connected to the latter to induce compensating adjustment in the latter. The system as a whole, and especially these other devices, are more fully disclosed, and are claimed, in our copending application, Serial No. 415,603, filed October 18, 1941.

The present device, in the embodiment illustrated and chosen by way of example, is in the nature of an outflow valve with two regulating or controlling means, one of which is an absolute-pressure sensitive device, and the other of which is a differential-pressure sensitive device, these two devices operating in a manner and to an end similar to the operation of similar devices in the Price patent, but operating now upon a single valve means to control outflow, rather than acting jointly and cooperatively upon an inflow and an outflow valve means, as in the Price patent. When we speak of a single valve means, it is to be understood that normally duplicate valve means would be employed, each of which alone would suffice, and each of which is such a single valve means.

Reference is also made to the copending Price application, Serial No. 216,028, filed June 27, 1938, which discloses an addition to and improvement upon the Price Patent No. 2,208,554. Certain of the operations disclosed in that application, and certain of the advantages thereof, can be employed and incorporated in this invention (see Figure 8). That Price application, Serial No. 216,028, discloses how it is possible to regulate and to vary the rate of pressure change in the cabin independently of the rate of ascent or descent, more especially, in accordance with a time factor. By the invention therein disclosed it is possible to effect a given change of cabin pressure in a given period of time, whether or not there is any change of altitude of the airplane, and if there is a change of altitude, regardless of the rate of that change. The same sort of regulation can be effected in the present invention.

In addition, or alternatively, according to the present invention, in one form illustrated, it is possible to effect regulation of the cabin pressure in accordance with the rate of change of altitude. For example, the cabin pressure may always have a value which is a chosen percentage of the difference between sea level pressure (or some other selected datum pressure) and the actual pressure at the attained altitude. Regulation or change of cabin pressure therefore occurs only with change of altitude, and not at all in accordance with a time factor, yet the rate of change of cabin pressure may be said to correspond to the rate of change of altitude, though the absolute value may differ from the absolute external pressure. It is to be observed that the chosen percentage may be now one value, and again a different value.

Such rate of change regulating means will be desirable whether or not there is associated therewith an absolute-pressure responsive control or a differential-pressure responsive control, either or both. Usually an overriding differential pressure control would be employed in any case, but it may be separate from rather than associated with a rate-of-change control, and the latter is capable of functioning regardless of the presence of the former.

If duplicate valve means are employed, one only may be provided with certain adjustments, for instance the adjustments for regulating the rate of pressure change in accordance with a time factor, and the other may not have any similar regulation, or may have associated with it the means for accomplishing the regulation in a manner which is proportional to the rate of change of altitude. Preferably all will have an overriding differential-pressure sensitive device limiting the attainable difference of cabin pressure over external pressure, and, coupled therewith, such other controls or adjustments as are desired, but not necessarily every valve provided with all such other controls or adjustments. In all cases such valves or duplicate valves will control and permit continual outflow, except as one may be a standby valve operative only when another fails. When operative the standby valve will control and permit constant outflow.

There have been devices known to the art which attempted to control cabin pressure substantially solely through the operation of an absolute-pressure sensitive device upon an outflow valve, with an independent safety means in the nature of a pressure limit valve set to open if the cabin pressure should tend to exceed a given value or differential. Usually these safety valves, visualized as responsive only to cabin pressures, were actually exposed also to external pressures, and hence acted inherently as differential-pressure sensitive valves.

The present device is to be distinguished from such as these, particularly in that in such former devices the safety valve, which acted as a differential pressure limiting device, was wholly independent of the normal outflow valve means, and of the absolute-pressure control for the same, whereas in the present arrangement the absolute-pressure sensitive device and the overriding differential-pressure sensitive device are cooperative in their action, and both act upon a single valve means which is the normal outflow valve.

The present device operates as an outflow control, and has no essential relation to inflow control. Indeed, given sufficient pressure supply, no regulation of inflow is essential; it is preferred, however, to regulate inflow, and, in some cases, to directly coordinate inflow with outflow.

GENERAL PURPOSES

By the arrangement of this invention it is possible to effect unified and sensitive control of the outflow valve means, thereby tending to maintain cabin pressures automatically more nearly at the intended pressures, whether the valve means is operable under the influence of the absolute-pressure sensitive device or under the influence of the differential-pressure sensitive device. Thus without manual operation the cabin pressure may be caused to follow a selected line or graph (see Figure 5), and these values, by certain manually or mechanically changeable means, under control, can be varied to suit different conditions, but always for any given setting the values of pressure within the cabin will be maintained automatically closely approximating the intended values—assuming always sufficient capacity in and proper functioning of the pressure supply devices and controls.

It is the intention that the device of this invention shall operate in conjunction with other means which regulate the supply of air under pressure within the cabin. The present device is therefore balanced in its design and adjustment with such supply or supply-controlling means, and may be physically or functionally connected with the latter device (see Figure 7), although it may be physically independent thereof (see Figure 6), and therefore simpler in construction and operation. Such a relationship between them is, however, not essential, in so far as the present invention is concerned.

Generally speaking, then, according to the present invention there is provided a device for controlling or regulating automatically the pressure within a cabin, which pressure is built up by other means, which will permit a certain amount of outflow and therefore provide for proper ventilation of the cabin, which will tend to compensate for, but not to govern, changes in the ventilating rate, independently induced and regulated, and which will operate automatically in accordance with two control devices, one of which may be an absolute-pressure sensitive device and the other of which may be a differential-pressure sensitive device, to the end that the cabin pressure may be maintained automatically at desired values for any given altitude; and which, upwards above the point at which the cabin pressure reaches a selected limiting differential pressure, will not permit the cabin pressure to exceed that differential pressure, whether the tendency to exceed the same arises from an increased rate of supply of air under pressure within the cabin, or from a decrease in the external pressure with increase of altitude.

By way of example, the cabin pressure may be maintained, from sea level up to a selected critical altitude, substantially equal to the external pressure; from that altitude up to a selected higher altitude the cabin pressure may be maintained at a value or values higher than the external pressure, but not exceeding a selected differential, and may indeed follow almost any given curve or graph from almost any point of departure from the atmospheric pressure line to the limiting differential pressure line.

It is also an object to provide a control functioning in accordance with a time factor, as, a rate-of-pressure-change control, or a control operating for a given period of time, which will regulate the cabin pressure conjointly with, as modified by, or independently of, the other controls mentioned above.

It is further an object to provide an alternative or supplemental control functioning in accordance with rate of climb, to maintain automatically a cabin pressure which, from a given point of departure from the atmospheric curve, is a predetermined fraction of the difference between the datum pressure (usually sealevel) and the external pressure at all altitudes; see Figure 11.

With these objects in mind and others, particularly those which pertain to the mechanical construction and arrangement of the device, as will appear from the following specification, our invention comprises the novel parts, and the novel combination and arrangement of the same, both per se and with relation to the pressure cabin and to the air supply means, as is shown in the accompanying drawings, described in this specification, and as will appear more fully from the appended claims.

THE DRAWINGS

The accompanying drawings illustrate the invention in a form which has been found practical, though it will be understood that various changes in the form, character, and arrangement of the parts may be made in accordance with the principles to be made clear hereafter.

Figure 2 is a similar view showing the parts in the position they would automatically assume to maintain the cabin pressure elevated above external pressure between a critical low altitude and a medium altitude, and might be termed the constant pressure or isobaric position of the parts.

Figure 3 is a view similar to Figures 1 and 2, showing parts in the position they would occupy upon exceeding the medium altitude referred to above, and might be termed the differential-pressure position of the parts.

Figure 4 is a detail section illustrating a provision for emergency closing and retention of the outflow valve, which may be employed if desired.

Figure 7 is a similar view showing the device of the present invention arranged to produce compensating action in the pressure supplying means.

Figure 8 is a wiring diagram, illustrating how the normal operation of the device of this invention may be altered to produce different effects, and in particular to produce a change of pressure in the cabin at a rate which is different from the rate which would be imposed by the actual rate of ascent or descent of the airplane.

Figure 9 is a detail view of a slight modification.

DEFINITIONS

Figure 1:
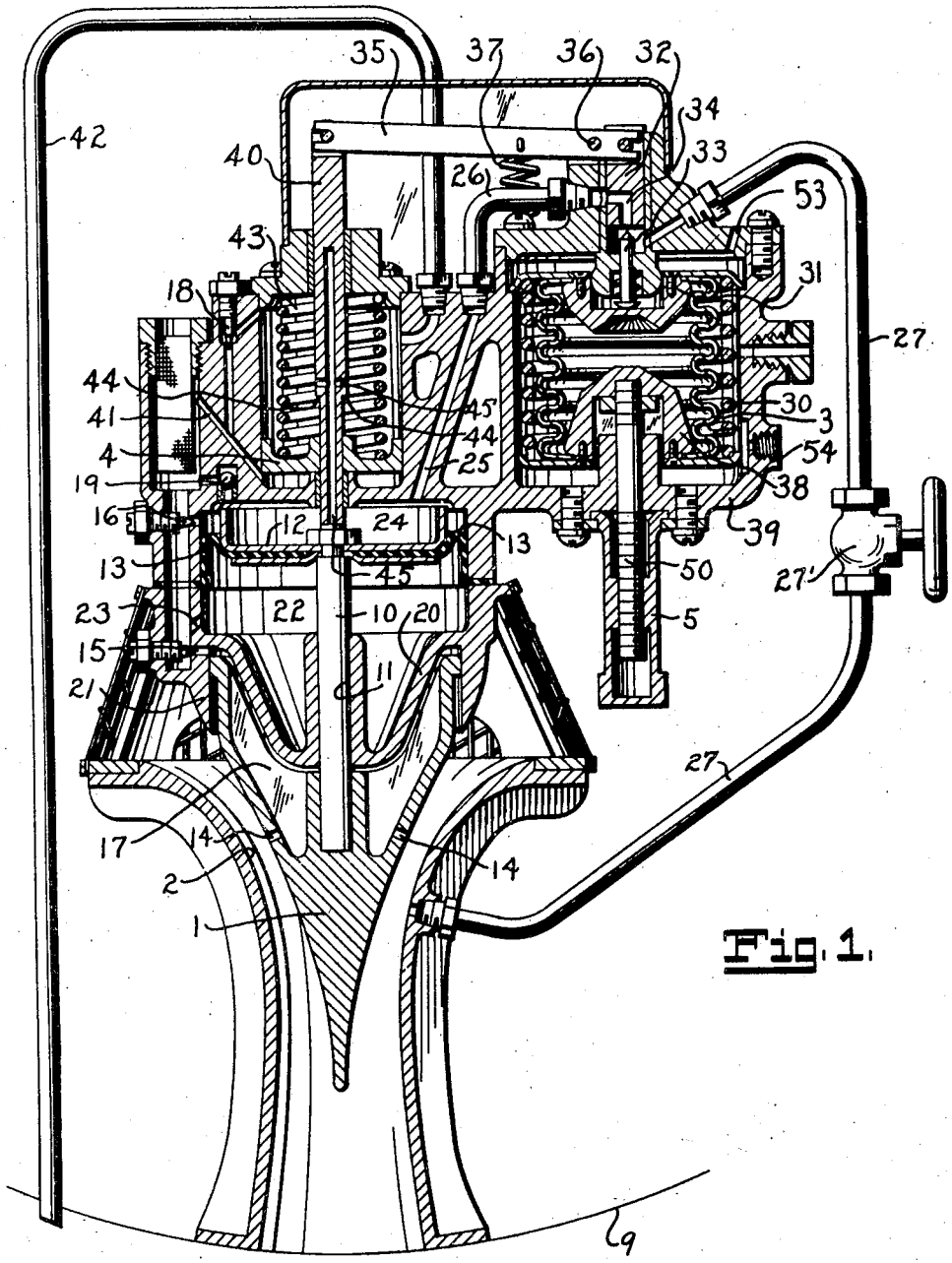
Figure 1 is in general an axial section through the outflow valve and the control mechanism, illustrating the parts in the low altitude position, that is, the position wherein the cabin pressure is substantially the same at all altitudes as the external pressure.

This application deals with pressures and pressure relations that are seldom stable. An absolute pressure that might under given conditions be regarded as positive, or high, will under other conditions be regarded as negative, or low. These terms, or the terms "plus pressure" and "minus pressure," are to be understood always as related to the immediately obtaining conditions, rather than as absolute terms.

The valve will be described as operable by a servo motor, which, as herein shown, takes the form of an air motor, operated by a difference of pressure. The terms "servo means" or "servo motor" are to be understood as including any suitable device, and not necessarily that described if another is suitable.

In the air motor a diaphragm is disclosed, but the term "diaphragm" is to be understood as including a piston, which is a special form of diaphragm, or any suitable pressure-actuated device. Likewise, the term "piston"—particularly as used in describing the differential-pressure sensitive device—is intended to include any form of diaphragm.

The term "proportional cabin pressure" will be used to denote a cabin pressure less than that at a selected datum or altitude (as sea level), but greater than that at the actual altitude, and bearing the same proportionate relation to these two values at all altitudes within the effective range of operation of the equipment.

CONSIDERATIONS GOVERNING DESIGN

A pressure cabin airplane designed for possible use under a variety of conditions must necessarily operate as a compromise between conditions which might obtain at one time, and conditions that might obtain at a different time, or under different circumstances. Obviously the conditions which obtain upon take-off from or landing upon a landing field which is at an elevation of several thousand feet are different from those which obtain upon take-off from or landing upon a landing field which is close to sea level. The design of the pressure cabin control must take into account the possibility of take-off or landing now at the more elevated field, and again at the lower field, and generally it has been considered that the fundamental considerations which must be brought to a satisfactory compromise in the selection of the pressure altitude relationship to be obtained in such a control are the following:

1. An optimum cabin pressure altitude which is sufficiently low—that is, a sufficiently high absolute cabin pressure—to avoid impairing the safety and comfort of operating personnel and passengers, and sufficiently high—that is, a sufficiently low absolute cabin pressure—to avoid the probability of a take-off or landing with the cabin in an inadvertently "supercharged" condition;

2. A maximum differential between cabin and atmospheric pressures which will not impose prohibitive structural requirements; and 3. A maximum ratio of cabin absolute pressure to atmospheric pressure which will not necessitate inordinate weight, size, or power consumption of the compressor.

PERFORMANCE CHARACTERISTICS

Figures 5, 6:
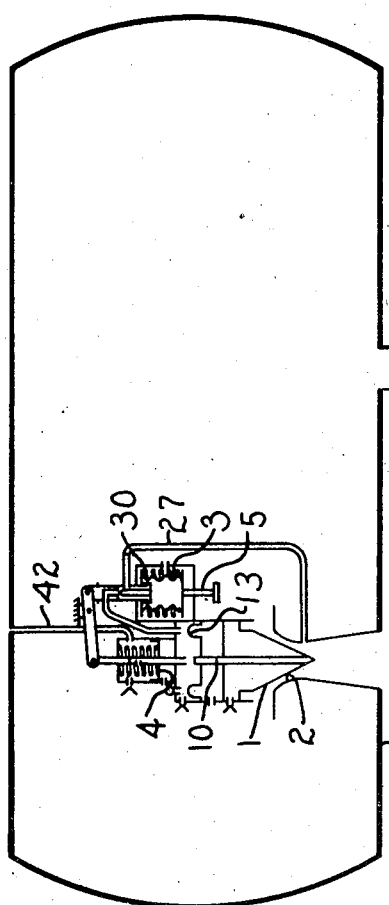
Figure 5 is a graph illustrating the pressure curve which the cabin pressure will follow automatically upon the normal or usually intended operation of the device of our invention.
Figure 6 is a diagrammatic showing of a pressure cabin, showing the device of the present invention incorporated therein as a pressure control device entirely independent of the pressure supply source, likewise associated with the pressure cabin.

In view of these limitations it is currently accepted that operations in the range from sea level—$a'$ in Figure 5—up to an appropriately chosen critical altitude, represented at $b$ or $b'$, should be unsupercharged, that is, the cabin pressure should be substantially the same as the external pressure, represented by the line $a'$—$b'$—$c'$—$d'$; that this critical cabin pressure altitude, that is to say, the cabin pressure which obtains at this critical altitude, for instance, 8,000 feet, should be maintained during ascent, as by the line $b$—$c$, until the differential pressure reaches a maximum safe and economical value, equivalent to 30,000 feet, for example; and that this limiting differential pressure $c'$—$c$ should be, or can well be maintained, along the curve $c$—$d$, so long as the aircraft continues above the altitude at which this differential pressure was reached, and so long as the pressure supply devices can continue to supply adequate air under pressure within the cabin. In the graph, Figure 5, the difference $a'$—$a$ represents the plus pressure due to continuous inflow and restricted outflow.

It must be borne in mind, of course, that the pressures may vary from the accepted graph $a$—$b$—$c$—$d$ thus outlined; for instance, it may be preferred, instead of commencing to supercharge only when the critical low altitude has been reached at $b$, to start supercharging at take-off or at some altitude $g$ lower than that at which normally it would commence automatically, and that it proceed at such a rate as to reach the constant cabin pressure $b$—$c$ at $h$ between the critical low-pressure altitude $b$ and the critical differential-pressure altitude c, and then follow the normal graph h—c—d, or that it continue until the limiting differential pressure is reached. Beginning at b, or some other such point, the pressure can increase with increased altitude (b—c''') or can decrease (b—c'') instead of remaining unchanged (b—c). Always provision is made that the limiting differential pressure is not exceeded. Within this limiting differential the cabin pressure may be altered at will and at such rate as may be desired, the lower limits of pressure being always the atmospheric curve a'—b'—c'—d', and the upper limits being always the differential pressure curve n—k—c—d, or that curve extended to higher altitudes.

It is possible, too, to anticipate a pressure change, and without actual change of altitude to accomplish a change of cabin pressure, as from j to k, and then to m. Always, and regardless of the part of the field of action chosen, the differential-pressure sensitive device is a sentinel to prevent that differential being exceeded, to the possible detriment of the cabin structure.

Figure 11:
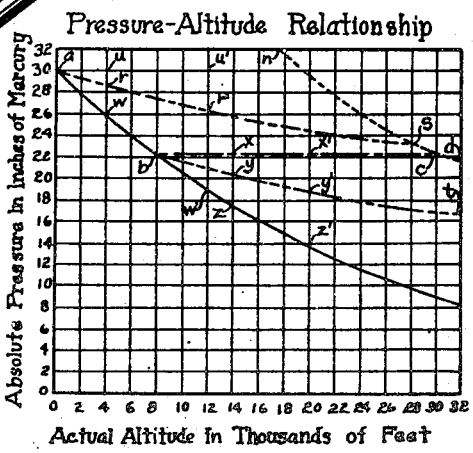
Figure 11 is a pressure curve, similar to Figure 5, showing graphically how the device of Figure 10 may operate.

Likewise it is possible to initiate an increase of cabin pressure over external pressure (see Figure 11) at sea level, a, or at some different altitude, b, and to continue that increase at a rate which is represented by a selected mathematical relation or formula, represented by the curves a—s—d, or b—t, (Figure 11) in which the ratio $$\frac{u-r}{r-w}$$

is always equal to the ratio $$\frac{u'-r'}{r'-w'}$$

at any other corresponding locations on lines as and az, or the ratio $$\frac{x-y}{y-z}$$

always equal to the ratio $$\frac{x'-y'}{y'-z'}$$

at any other corresponding locations on lines bt and bg, as the aircraft ascends from sea level, or from altitude b, respectively.

Reference is made to the patent of James B. Cooper, one of the coinventors herein, No. 2,307,199, issued January 5, 1943, to illustrate the possibilities of controlling the rate of pressure change, and of operating other than along an unvarying graph.

For a further understanding of the manner of operation of the device and the principles governing the same, reference is made to the copending Price application, Serial No. 216,028, referred to above, and particularly to Figure 3 therein.

Figure 5, representing at a—b—c—d an example of the normal manner of operation of the present device in an actual airplane, shows that there will be no essential supercharging effect so long as the cabin absolute pressure exceeds 22.22 inches of mercury, which is equivalent to a pressure altitude of 8,000 feet. This is below the altitude where human distress is noticeable, yet is higher than most landing fields. The 8,000 foot pressure altitude will then be maintained within the cabin until the limiting differential pressure of 13.34 inches of mercury is reached, which will normally occur at an altitude of 30,000 feet. At altitudes above 30,000 feet the limiting differential pressure of 13.34 inches of mercury will be maintained until the compressor or equivalent means to supply air under pressure within the cabin becomes incapable of producing the required pressure rise.

THE CABIN AND AIR SUPPLY DEVICES

In the drawings the skin of the airplane is represented at 9, and this skin is so constructed as to be reasonably air-tight for all internal pressures which do not exceed the external pressure by more than the selected differential. This is purely a design matter, and the skin can be made sufficiently tight to hold any desired differential, but it is scarcely economical and practical to attempt to hold sea level pressure up to the ceiling of the aircraft since this would require such structural complications and added weight as to make the airplane economically impractical. The skin 9 is tight against reasonable leakage, although some leakage is bound to occur, particularly as the differential limit is approached or reached.

As is seen in Figures 6 and 7, air is supplied under pressure within the skin 9 by means which are represented as the blower 90 driven from a suitable source of power, such as a propelling engine 91, through a speed varying device indicated at 92 and controllable by the member indicated collectively by the numeral 93. Control is effected in accordance with pressure conditions and flow conditions, or is controlled in any suitable manner, the control being represented as the pressure sensitive device 93a connected at 94 and 95 respectively to a duct leading to or from the blower and to a Venturi diffuser 96 or 96a within that duct. The pressure-sensitive device 93 may also be sensitive through a duct 93b (see Figure 7) to the cabin pressure. Without describing the arrangement in further detail, it may be said that the blower 90 will supply air under pressure within the cabin 9 through the duct 90a at a rate which is sufficient, within the capacity of the blower, to maintain a cabin pressure in excess of that which it is desired to maintain for the actual altitude of the aircraft. In other words, there is supplied an excess of pressure, which excess is relieved, controlled, and regulated by the device shown in Figures 1, 2, and 3. Since the particular form and arrangement of the air supply means is not material to the present invention, and may take various forms, as is disclosed more fully in our copending application, Serial No. 415,603, referred to above, no more need be said at this point concerning the same. Reference is made to that copending application for a fuller understanding of the air supplying means, and to a later point in this specification for an explanation of its operative relationship to the present control device.

THE PRESSURE CONTROL DEVICE

The construction and operation of the pressure control may be best understood by following through a cycle of operation. Figure 1 shows the position of parts at low altitudes (Condition A), where the cabin is substantially unsupercharged, but where the air is being supplied by the air supply means in a manner and at a rate which, without proper operation of the pressure control device, would effect supercharged operation. Figure 2 shows parts in the position they would occupy during isobaric regulation, under control of the absolute-pressure sensitive means (Condition B). Figure 3 represents the position of parts during high altitude operation, under control of the differential-pressure sensitive means (Condition C). In no case are certain optional refinements (Figures 4, 7, and 8) incorporated in the showings of Figures 1 to 3, in the interests of simplicity, but such refinements may be included at will. The description will proceed without reference to these refinements, and their nature and relationship to the main control device will subsequently appear.

Condition A

Figure 1 shows the operation at a low range of altitude wherein cabin pressure in excess of atmospheric pressure is not required, although a small pressure differential will usually exist because of the restricted escape of the normal quantity of ventilating air which enters the sealed cabin 9 through the compressor or through independent fresh air scoops.

The valve 1 controlling outflow from the cabin 9 tends to seat upon a diffuser seat 2 by virtue of the low pressures which are existent on the lower surface of the valve as shown and which are partially due to the Venturi action of the air passage, and partially due to any differential pressure existing between the cabin and the atmosphere. This action is independent of the attitude or positioning of the valve. If the valve is mounted in the vertical position, as shown in the preferred arrangement of the drawings, gravity forces will tend to seat it, in addition to the pressure-created forces. The valve 1 is carried upon a spindle 10, guided for axial movement at 11, and upon the upper end of this spindle, above the partition 20, is secured a sealing diaphragm 13 backed by the piston 12. The pressures due to the outflow of air and for some positions of installation, the weight of the diaphragm-valve assembly, would normally seat the valve at 2 to close off outflow from the cabin.

It is evident that a suitable differential pressure acting upward across the diaphragm 13 will overcome the gravitational force and any other forces which act downward upon valve 1, and will thereby cause the diaphragm valve assembly to rise, particularly since the effective area of the diaphragm 13 is somewhat greater than that of valve 1. A spring 14' (see Figure 9) may serve the same end, or may be used to assist the pressure forces to such end.

To assist in holding the assembly raised, once the valve is open, the space 17 above the hollow valve body 1 is in communication with a low pressure source. As shown, it is provided with vent holes 14, located somewhat below the portion of the valve which seats upon the diffuser, but being approximately in the throat of an annular venturi formed between the open valve and the diffuser seat, and the interior of the space 17 thus formed between the hollow valve 1 and the partition 20 is open to cabin pressure past a needle valve 15, which restricts access of cabin pressure to the chamber 17. The pressure within the chamber 17 is reduced, by suction through the vent holes 14, tending to resist closure of the valve 1. Leakage past the lip of the valve 1 where it slides within the cylinder 21 may somewhat alter these conditions, but is small, and can be compensated for by the adjustment of the needle valve 15, or if preferred, leakage at this clearance can be eliminated by the employment of a sealing diaphragm between the casing part 21 and the lip of the valve, similar to the diaphragm 13.

In lieu of the holes 14 in the valve 1 an alternate arrangement is to connect chamber 17 to the passage between valve 1 and diffuser seat 2 or any source of lower pressure by means of an exterior tube. If the effective area of the diaphragm 13 is sufficiently large, the provisions described above will be unnecessary for the operation of the control.

The chamber 22 beneath the diaphragm 13 is in free and open communication with the interior of the cabin, and of course to the cabin pressure, through a vent 23. Cabin pressure therefore acts upwardly upon the diaphragm 13 and the diaphragm valve assembly, tending to hold the valve upraised in opposition to gravity and other forces, and the final control for the diaphragm valve assembly therefore depends upon the negative pressure within the chamber 24 above the diaphragm. Air from the cabin, under pressure, enters the chamber above the diaphragm 13, past the needle valve 16, and escapes through the port 25 and extension tube 26 under certain conditions—these conditions including an effective connection from the tube 26, as by way of the tube 27, to a source of minus or low pressure. A convenient low pressure source is the throat of the annular venturi adjacent the diffuser seat 2. Another source might be the external atmosphere, particularly at appreciable altitudes, or the vacuum system of the airplane.

For the condition of operation now under consideration air flows away from the chamber 24 without appreciable restriction, and if the needle valve 16 is properly adjusted it will restrict the flow of air from the cabin sufficiently to cause a reduction in pressure relative to the cabin pressure above the diaphragm 13. This is additive to any reduction of pressure within the chamber 17. Under such circumstances even a slightly lower external pressure communicated through the tube 27 to the chamber 24, or even a slightly higher cabin pressure acting through the port 23, will cause the valve 1 to open, and thereby prevent any increase in cabin pressure relative to external pressure.

It is desirable, but not entirely practical, that this condition of operation should persist throughout the range of altitudes at which the aircraft will normally be operated. It is not entirely practicable for the reason that it will occasionally be necessary for the airplane to climb to such altitude that altitude effects may be felt by the crew or the passengers, and before this can occur, supercharging should be commenced. At a suitable cabin pressure altitude this form of operation terminates, and supercharging begins.

Condition B

The position of parts for the isobaric operation which is automatically initiated upon the attainment of a selected critical low altitude is shown in Figure 2. At a cabin pressure altitude where it is desirable for supercharging to commence, the cabin pressure, acting upon the evacuated Sylphon bellows 3, becomes inadequate to equilibrate the combined expansive forces exerted by the spring 30 and by the resiliency of the bellows itself. This evacuated bellows 3 may be considered as an absolute-pressure sensitive device. Upon its expansion, assisted by the spring 30, in an upward direction in the drawings, its head 31 acts upon the metering pin 33 to restrict the flow of air through the orifice 34 in the slidable plug 32, which is interposed between the tube 26 and the outlet tube 27. This restricts the flow of air from the upper side of the diaphragm 13 through the orifice 34, and thus tends to equalize the pressure across the diaphragm 13, causing the valve 1 to move towards its seat, as previously explained.

Closing movement of the valve, unless accompanied by precisely correspondingly reduction of pressure of the inflowing air to the cabin, which does not ordinarily occur, increases the cabin pressure. This in turn causes recompression of the bellows 3 and reopening of the orifice 34 to the passage of air from the upper side of the diaphragm 13, which results in the reopening of the valve 1 and a consequent reduction of cabin pressure.

It is clear that the foregoing action would result in a repetitious cycle of instability wherein the valve would hunt and the cabin absolute pressure would oscillate between values slightly above and slightly below the preselected critical value at which the bellows 3 begins to expand. This undesirable effect is overcome by the linkage of the valve 1 to the orifice 34 through the plunger 40 and rocker arm 35, the fulcrum of which is at 36, and which may have its longer arm pulled downwardly by the spring 37. As the valve 1 closes in response to expansion of the bellows 3 the orifice 34 is withdrawn slightly from the metering pin 33, thus tending to reopen the passage through the orifice 34 and to check the downward travel of the valve 1. Conversely, as the valve opens to relieve superfluous air from the cabin the orifice 34 descends upon the metering pin 33, and thereby restricts the flow of air from the upper side of the diaphragm 13, and checks the upward travel of the valve 1. It can thus be seen that as the valve begins to move in either direction in response to change in cabin absolute pressure there is an immediate countereffect which opposes such motion and prevents overtravel of the valve. The result is that the position of orifice 34 and metering pin 33 relative to each other is so maintained as to meter the flow of air from the upper side of diaphragm 13, and thereby cause valve 1 to seek a stable position.

Since this stable position of the valve may vary considerably with changes in the ventilating rate, differential pressure, or in cabin leakage conditions, the linkage between valve 1 and orifice plunger 32 is so arranged that the travel of the valve is considerably greater than—as shown, approximately twelve times—that of the orifice in the particular installation pictured. In this way neither the position of the orifice 34 nor the critical cabin absolute pressure which the unit tends to maintain is appreciably altered by any responsive movement of the valve.

It is evident that the orifice 34 might move relative to the metering pin 33 under the influence of the bellows 3, with like results. In other words, the arrangement of 33 and 34 might be reversed, and a description of the one is intended to include the reverse.

The regulating effect described occurs because the action of the spring (the actual spring 30 or the bellows 3 considered as a spring) occurs within a very narrow range, and hence there is substantially no change, during operation, in its effective spring force. By change in the spring rate of the bellows unit or its spring, the limits of cabin pressure between the illustrative altitudes of 8,000 feet and 30,000 feet may be made to follow curve b—c''', or curve b—c'', as shown in Figure 5. Similar results can be obtained otherwise—for instance, by changing the leverage ratio of the follow-up rocker arm 35, or by changing the relative size of the metering pin 33 and its orifice 34, or by two or more such changes combined.

It may be pointed out here that the value of the critical limit can be altered, to start supercharging either before or after reaching the 8,000 foot specified critical limit of low altitude operation. The critical limit can be lowered by moving upwardly the base 38 of the bellows 3. Thereby in effect the spring force resisting collapse of the bellows 3 is changed. Also, by control of the rate of upward movement of the base 38 the rate of supercharging can be controlled. These facts are merely mentioned at this point, and their significance and application will be explained in greater detail hereafter.

*Condition C*

When the cabin differential pressure attains the chosen limiting value during ascent, under conditions of isobaric regulation, a differential-pressure sensitive device automatically overrides the absolute-pressure sensitive device 3 under all conditions, and assumes command of the pressure regulation within the cabin, to the end that the selected differential may never be exceeded. Figure 3 illustrates operation under Condition C.

A piston 4 is exposed to cabin pressure on its lower side through a vent 41, and to atmospheric pressure on its upper side through the tube 42. Cabin pressure, throughout isobaric operation, is elevated above atmospheric pressure. At the critical differential of cabin pressure over external pressure, spring 43 is sufficiently compressed by the upwardly moving piston 4 so that the piston engages a shoulder 44 on the plunger 40. If, by reason of continued ascent and lowered external pressure, or by reason of increased cabin pressure, there is a tendency to exceed this differential, thereby the plunger 40 is raised upwardly and separated from the stem 10, to which it has heretofore been held by spring 37 acting through lever 35. In practice the separation is minute, only a few thousandths of an inch, but it must be exaggerated in the drawings for purposes of clearer illustration. With the downward force of spring 37 on the valve 1 through lever 35 and plunger 40 removed, the flow of air from the upper side of the diaphragm 13 through the aperture 45 in the plunger 40, with its ports 45' and the tube 42, reduces pressure above the diaphragm 13 and causes the valve to open and relieve cabin pressure, as explained under the description of operation under Condition A. Overtravel of the valve is prevented by the fact that, as contact between the plunger 40 and the stem 10 is broken by the action of the differential pressure control, the valve assembly follows the plunger 40 upwardly, and tends to restrict the entry of air into the bore 45 of the plunger and to raise plunger 40 against the action of spring 37. It is thus evident that an immediate resistance to further motion accompanies any increase in the lift of the valve in response to action of the differential pressure control, and that there will be no tendency for the valve to hunt, or for cabin pressure to fluctuate. The absolute-pressure sensitive device 3 will extend toward its full upward travel as altitude is increased and external pressure is lowered, so that the passage of air through the orifice 34 is eliminated by closure of the valve 33, except for negligible leakage.

The stem 10 has been shown integral with the valve 1, and with the piston 12 fixed directly thereupon. These elements may be altered in their relationship, without change in the essential nature of the invention. The stem 10 has been shown solid, and the plunger 40 hollow, and this relationship might be reversed, so that the chamber 24 is vented to a low pressure source through a hollow valve stem, and the cooperating plunger 40 would then be solid. Such reversal is within the spirit of our invention.

For brevity the piston 4 may be spoken of as the differential-pressure sensitive device, as the bellows 3 has been referred to as the absolute-pressure sensitive device. While each of these is the element most immediately affected by such pressure conditions, it will be realized that the associated elements, together with and in their relationship to the elements 4 or 3, as a whole make up, respectively, the differential-pressure sensitive means and the absolute-pressure sensitive means.

SAFETY DEVICES

It is conceivable that negative pressure might fail, by reason of a sufficiently rapid descent, or, if the source of low pressure for operation of the diaphragm 13 or the piston 4 is the vacuum system of the airplane, it is conceivable that this might fail to function. In either case there would be a failure of negative pressure in such a way that there would be a tendency for the valve 1 to close and remain closed, to an extent that atmospheric pressure might exceed cabin pressure. It is desirable to prevent the possibility of reverse stresses, thus arising. A check valve 19 is normally seated to close off an orifice that otherwise would afford communication between the cabin pressure and the space 24 above the diaphragm 13.

Valve 19 is normally held seated by the differential pressure existing between the cabin and the chamber 24, which is normally at some pressure below cabin pressure. If the external pressure should exceed the cabin pressure this external pressure would communicate with the chamber 24, for instance through the tube 27, past metering pin 33, and through tube 26, and the valve 19 would then unseat and permit equalization of cabin pressure with the external pressure, and would thereby assist in opening the valve 1 by removing obstacles to its opening under the higher external pressure acting upwardly upon it.

In the event of an unexpected air leak somewhere in the control, such as between duct 45 and chamber 24, or the occurrence of a failure in some component part of the control unit, either of which under some conditions might tend to raise the valve from its proper position at an inopportune time, or in the event of a large leak occurring in the cabin sufficiently large to warrant conserving all the air possible by preventing all outflow past a valve 1, it is desirable to provide means whereby the valve 1 may be completely closed and held closed under such emergency conditions.

A means to that end is illustrated in Figure 4, and may be incorporated in all forms. In line with the plunger 40 is a pin 46 normally held upraised out of the path of the plunger 40 by a spring 47. A screw cap 48 is swiveled upon the pin 46, and upon pressing downward upon this cap the pin 46 is moved downwardly to depress the plunger 40, and hence the valve spindle 10 and the valve, and by engagement of the threads of the cap 48 with the fixed threads 49 the valve may be closed tightly and held closed. Obviously, equivalent engaging means may be employed in lieu of the threads 49.

A normally open valve 27' may be included in the tube 27. If the absolute-pressure sensitive device 3 should fail to function properly, it can be cut out by closing the valve 27'. This leaves the limiting differential-pressure sensitive device 4 still fully operable, to prevent the cabin pressure exceeding the predetermined difference over external pressure, and by suitable means the pressure supply can be augmented or manually controlled, if necessary, to supply adequate pressure within the cabin.

SELECTIVE ISOBARIC AND DIFFERENTIAL PRESSURE REGULATION

The cabin pressure which will be maintained during operation under condition B may be altered, within practical limits, by altering the adjustment of the absolute-pressure sensitive device 3. This adjustment may be accomplished in various ways, for instance by altering the compression of the spring 30, the compression in the bellows 3 itself, or the starting point or position of the base 38 and needle valve 33 with relation to the orifice 34.

Practically speaking, such adjustment is readily accomplished by rotating the swiveled and internally threaded adjusting cap 5 (or a cable drum mounted thereupon) relative to the screw 50 which supports the base 38. If the cap 5 is rotated in a direction to raise the base 38, the elongation of the bellows which is required to produce the necessary metering effect through the orifice 34 is decreased, and the critical low pressure altitude at which Condition B commences (b in Figure 5) will be lowered. Contrariwise, if the cap 5 is rotated in a direction to lower the base 38, the elongation of the bellows 3 which is required to produce the necessary metering effect through the orifice 34 is increased, and isobaric regulation does not commence until a higher altitude is reached; see, for example, p—q in Figure 5.

In this way, and without more, the point at which isobaric regulation commences may be adjusted at will and during flight. Adjustment of the starting point, however, will not affect the nature of the graph, Figure 5, nor affect the essential nature of operation of the absolute-pressure sensitive device 3 nor of the differential-pressure sensitive device 4. No such adjustment of the starting point of isobaric regulation, as from b to p, can affect the initiation of differential pressure operation when the limiting differential is reached. In other words, no adjustment of the pressure altitude which is maintained during isobaric regulation can cause the differential-pressure sensitive device to fail to operate when the selected differential of pressure is attained, along the line n—c—d.

The cabin differential pressure which will be maintained during operation under Condition C is to a small extent adjustable (see line r, Figure 5) by means of a needle valve 18, which controls communication between the upper and lower sides of the piston 4. In the drawing, piston 4 has been shown as the preferred arrangement, but the differential pressure controllability of the unit will function equally well if a diaphragm similar to 13 be used. It is clear that with negligible air leakage around piston 4, the full cabin-atmosphere differential pressure will be impressed upon it. Then if a leakage be induced either by increased clearance between the piston and the cylinder, or by opening metering valve 18, there will be a small pressure increase in tubing 42, which increase will in turn reduce the differential pressure acting upon the piston. Likewise it is evident that a small increase in leakage through the valve 18 is equivalent to an increase in the elastic properties of the spring 43. By adjustment of the valve 18 the value of the differential pressure may be altered to increase or to decrease it.

It is possible to obtain any desirable range of adjustment of both the absolute and differential-pressure control elements by the proper variation of the effective elastic properties of the springs 30 and 43, according to expedients which are universally employed for spring adjustments.

COMPENSATING NEEDLE VALVES

Adjustment of needle valve 16 permits the proper coordination of the passage of air from the cabin to the upper side of the diaphragm 13 with the restrictions arising from each individual installation of tubes 27 and 42. Also it serves as convenient adjustment of the leakage to chamber 24 and thence out through the absolute pressure sensitive control, which leakage effectively controls the stability of operation of the control valve 1 when under isobaric regulation.

Needle valve 15 has been provided for the purpose of compensating for varying clearances around the lip of valve 1 and permits the proper coordination of the leakage into chamber 17 with the leakage out through holes 14. In other forms of the device it might serve the purpose of varying the damping effect of the air entrapped above valve 1 in chamber 17.

RATE OF PRESSURE CHANGE CONTROL

As has already been pointed out, the cabin pressure, between the lower limit fixed by the atmospheric pressure curve $a'—b'—c'—d'$ and the upper limit fixed by the differential pressure curve $n—c—d$, may be varied by adjustment of the orifice valve 33 with respect to its orifice 34, or vice versa. It has already been pointed out that such an adjustment may be accomplished by adjustment of the position, up or down, of the base 38. Such adjustment as heretofore explained was for the purpose of determining and adjusting the initial point ($b$ to $p$) and absolute value of isobaric regulations. However, such adjustment can also be used for the further or somewhat different purpose of importing a time element and of accomplishing increase or decrease of pressure at any point, from sea level to the ceiling of the pressure supply system, within the limit fixed by the differential pressure limits, independently of or at a rate different from that normally required by ascent or descent.

To illustrate by reference to Figure 5, a pilot taking off from sea level at pressure $a$ may intend to ascend as rapidly as possible to an altitude which is above that represented at $c$. Instead of attempting to follow the substantially unsupercharged curve $a—b$ and thence by way of $b$ to $c$, the pilot may prefer to decrease his cabin pressure at a rate which will bring him to the value $c$ at the time, having in mind his rate of climb, that he will reach the altitude represented at $c$. Or, he may wish to lower his cabin pressure at a rate which will bring him back to the line $b—c$ at the point $e$, and thence forward he may follow the line $e—c—d$, or he may wish to continue at a substantially constant rate of decrease of cabin pressure from $e$ to $f$, and so on until he reaches the differential pressure limit $c—d$. Again, after he has climbed for some distance, he may, at an altitude corresponding to $g$, wish to decrease his cabin pressure at a rate which will bring him on the curve $b—c$ at the point $h$, and thereafter he may follow the curve $h—c—d$. Again, in descending he may be at an altitude corresponding to the point $j$, and in anticipation of a later descent, but without actually descending, he may increase his cabin pressure, as indicated from $j$ to $k$, and then further decrease it from $k$ to $m$, representing the pressure at his landing field, and thus while several thousand feet above his landing field, but still well within the permissible differential, he may attain within the cabin a pressure corresponding to the pressure at the landing field. By such means he may lessen the rate of cabin pressure rise or fall, and may become more gradually accustomed to the altered pressure.

By the use of the basic cabin pressure control already described, these ends can be attained simply by governing the rate of rotation of the screw cap 5 or equivalent means, and by governing thereby the rate of rising or lowering of the base 38. A suitable means to this end is illustrated diagrammatically in Figure 8, wherein 6 represents a reversible variable-speed motor operatively connected by any suitable drive means to move base 38 at a controlled rate and in either sense.

The means for rotating the motor and for controlling its speed may be any that are desired, and that shown herein is to be understood as merely representative of any one of several means that could be employed. For instance, 60 represents a rheostat to control the speed of the motor, and 61 a reversing switch to control its sense of rotation. In addition, it may be provided with a means which is automatically capable of stopping the motor after a given time interval or after a given number of rotations.

Thus, for example, 63 represent a settable contact arm engageable with any one of a number of contacts 64$a$, 64$b$, 64$c$, etc. We may assume that it is set in contact with the point 64$e$. The contact arm 62, driven by or synchronized with the motor 6, rotates past a series of contacts 65$a$, 65$b$, 65$c$, etc., corresponding to and connected each with its respective contact 64$a$, 64$b$, etc. Current from a source represented at 66 may pass, when the rotating contact arm 62 engages the contact point 65$e$, by way of the settable arm 63 and the rotatable arm 62 to an electromagnet 67, which upon being energized opens a switch 68 in the circuit of the motor 6, and stops the operation of the motor. Either of the arms, 62 or 63, may be motor-driven, and the other will then be the settable arm.

By such an arrangement it is possible to regulate the speed of the motor, its sense of rotation, and the time period during which it is to operate. By control of these factors, acting to rotate the screw cap 5 in one or the other sense for a selected period of time and at a selected rate of rotation, it is possible to achieve change of pressure within the cabin at any rate desired, whether for increase or decrease as desired, and throughout any time period desired.

Nevertheless, with any possible adjustment of the screw cap 5 and of the absolute-pressure sensitive device 3 which is thereby entailed, the differential-pressure sensitive device 4 is always capable of functioning and does function to prevent, under any conditions, the exceeding of the selected differential of pressure represented at $c'—c$ in Figure 5.

CHANGE OF PRESSURE PROPORTIONAL TO CHANGE OF ALTITUDE

Figure 10:
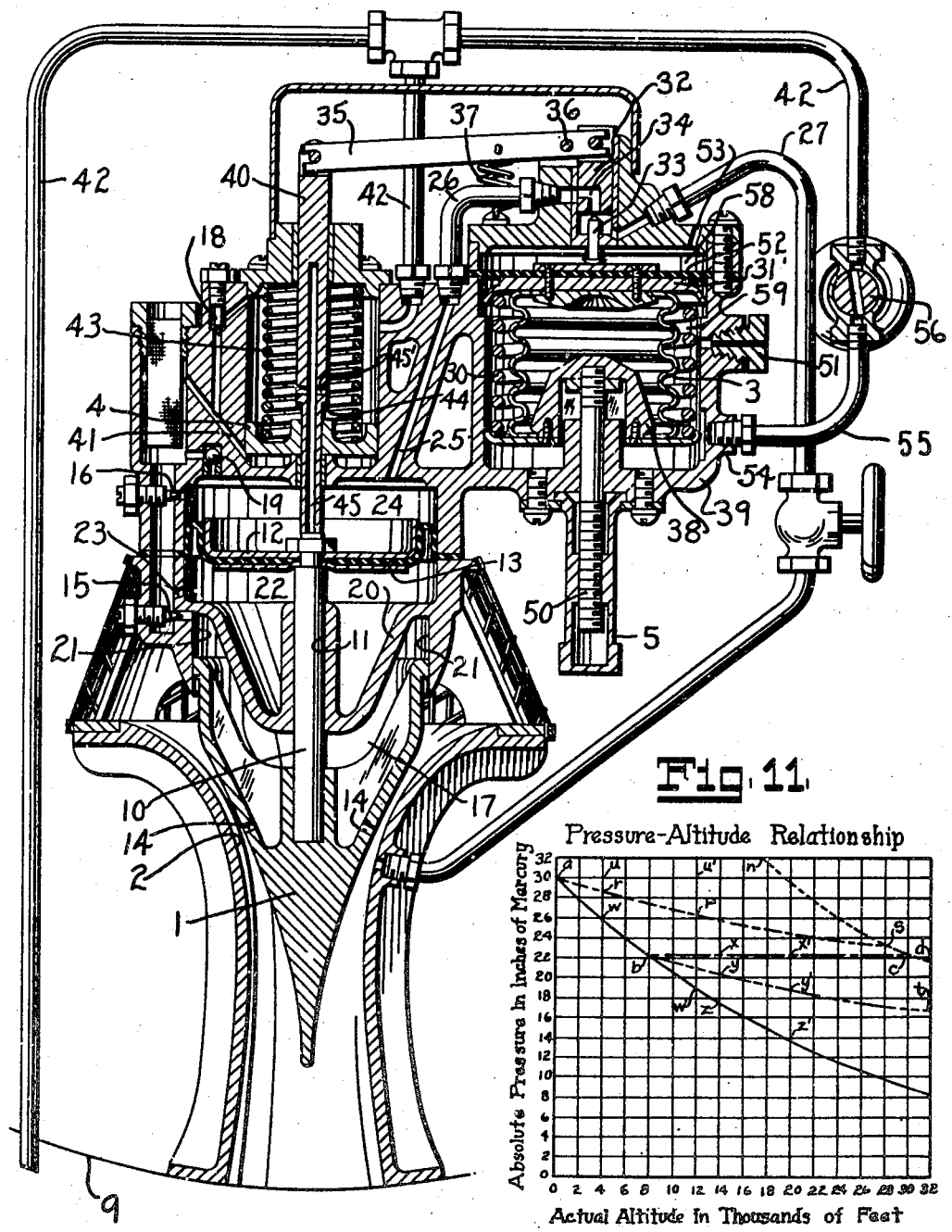
Figure 10 is a view similar to Figure 1, of a modified arrangement, enabling maintenance of proportional cabin pressures.

By means of controls such as are illustrated in Figure 10, and which represent but a slight rearrangement of the parts of the device, the elevation of cabin pressure above atmospheric pressure may be regulated so that it is a fixed fraction above or percentage of the difference between sea level (or some take-off value, or any arbitrarily selected datum) and actual atmospheric pressure. For instance, referring to Figure 11, the cabin pressure may follow the graph a—r—r'—s, in which $$\frac{u-r}{r-w}=\frac{u'-r'}{r'-w'}$$

and the ratio $$\frac{u-r}{r-w}$$

may be, for example, 1/2. Or, starting at the datum line or altitude b—x—c, or some other isobaric line, the cabin pressure may follow the graph b—y—y'—t, in which $$\frac{x-y}{y-z}=\frac{x'-y'}{y'-z'}=2/3$$

In any case, however, the overriding differential pressure control, like a sentinel, automatically limits, as at s, the differential of cabin pressure over external pressure.

Such proportional regulation is accomplished by use of a modified arrangement of the control, shown in Figure 10. A diaphragm 52 divides the space within the casing 39 into an upper chamber 58 and a lower chamber 59. The bellows head 31' may be modified slightly, and be connected to the diaphragm 52. The upper chamber 58 is always subject to cabin pressure by way of port 53. The lower chamber, by an adapter plug, is permitted communication with the cabin only by way of a bleed port 51, which functions as a small fixed orifice, but which is exaggerated in the drawing. At 54 is connected a tube 55, communicating, past a metering valve 56, with the exterior atmosphere, as for instance, by way of the tube 42. In other respects the unit may be substantially unchanged, and may retain all its capabilities, as previously described, including the ability to adjust the spring force by the screwcap 5.

The valve 56 functions as a variable orifice, related to the normally smaller fixed orifice 51. The relation of absolute cabin pressure to sea level pressure, or to some other datum pressure, or to atmospheric pressure, may be made to depend upon the size of the variable orifice, that is, upon the adjustment of the relative sizes of the orifice 51 and opening through valve 56. If the valve 56, the variable orifice, is completely closed, the situation is as though the orifice 56 did not exist, and the device will function substantially the same as in the form of Figures 1, 2, and 3, for now, as in those figures, in effect, the cabin pressure only is impressed upon the bottom and upon the top of the diaphragm 52, and the bellows functions in response to removal of a collapsing force opposing its spring 30, to initiate cabin supercharging and to maintain cabin pressure. The cabin pressure will follow or parallel the atmospheric pressure curve from a to b, then regulation is isobaric from b to c, and after the limiting differential is reached the differential curve c—d is followed. The point b, of course, can be varied by repositioning of the base 38 by the adjustment at 5, as already described. This is not the manner of operation which is primarily intended for this modified structure, but it illustrates how this structure can still operate in a manner wholly analogous to the structure previously described, while still possessing additional capabilities.

If the valve orifice at 56 is fully open, lower chamber 59 is nearly at atmospheric pressure, even though cabin pressure enters at 51, for the fully open orifice 56 is so much larger than the orifice 51 that cabin pressure entering the chamber 59 at 51 is exhausted immediately by way of tube 55, and its effect is negligible. It follows that there is a downward force over the whole of the area of the diaphragm 52 which is the cabin pressure times the diaphragm area, and there is an equivalent opposing upward force equal to the fixed force of the spring 30 (plus the force of the bellows considered as a spring) plus the atmospheric pressure over the annular diaphragm area outside the bellows 3. These opposed forces can be so balanced that the atmospheric curve is departed from at any predetermined altitude, by suitable adjustment of the spring force, at 5; for instance, such departure can begin at sea level, to produce the curve a—r—r'—s, or it can begin at a value corresponding to altitude b, and the curve is then a—b—y—t.

That such a proportional rise is obtainable can be demonstrated by assuming certain dimensions and spring forces, in a concrete example. Let us assume that the bellows area is one square inch, and that the annular diaphragm area, outside the bellows, is two square inches; the total diaphragm area is three square inches. Atmospheric pressure at 8,000 feet being 10.9#/sq. in., the total downward force on the diaphragm is $3\times10.9\#=32.7\#$. The total upward pressure force on the diaphragm, acting only on the 2 sq. in. annular area outside the bellows, is $2\times10.9\#/\text{sq. in.}$, or 21.8#, and the spring force, to produce equilibrium and to initiate isobaric regulation at 8,000 feet, must be 10.9#.

At 15,000 feet altitude atmospheric pressure is 8.3#/sq. in. Acting upwardly on 2 sq. in., this, plus the fixed spring force of 10.9#, gives a total upwardly acting force of 27.5#. In equilibrium with this is the cabin pressure, an unknown quantity, acting downwardly over 3 sq. in. Expressed mathematically, (1) 3×cabin pressure at 15,000 ft.=10.9+2×8.3, or (2) cabin pressure at 15,000 ft.=9.2#/sq. in. In similar fashion the cabin pressure at other altitudes can be determined, but always it is found to be proportional to the annular diaphragm area over the total diaphragm area. In other words, referring to Figure 11, $$(3) \qquad \frac{x-y}{y-z}=\frac{10.9-9.2}{10.9-8.3}=2/3$$

with the dimensions assumed. This corresponds with the ratio of the annular diaphragm area to the total diaphragm area, hence it follows that the cabin pressure curve a—r—r'—s, or b—y—y'—t, depends upon the area relationship, at least in its limiting values, and can be changed by altering these area relationships. As the ratio of the annular diaphragm area to the bellows area increases, the pressure curve grows steeper, and more nearly approaches atmospheric, and vice versa.

But if, without altering these area relationships, we restrict 56 somewhat, so that it more nearly approaches equality to 51, and causes an appreciable pressure drop from 59 to atmosphere, as well as a pressure drop from cabin to 59, the curve becomes flatter, as it must, by Equation 1, if the value 8.3 approaches the value 10.9. In other words, we approach isobaric regulation as we approach equality of orifices 56 and 51, or as we approach full closure of orifice 56.

Now it can be seen that while the limiting value of the curve is determined by the area relationship, the ratio can be altered, within that limiting value, by altering the orifice relationship. Also, the initial point of departure from the atmospheric curve, as in the forms which have not proportional regulation, is determined by the spring force, and is adjustable by adjustment of the spring force. Furthermore, it can be seen that by determining the rate of adjustment of the orifice valve 56, in accordance with a time or with an altitude factor, the shape of the cabin pressure curve can be further altered, at will. Indeed, alteration of the cabin pressure curve can be induced, without change of altitude, by adjustment of the valve 56. The device thus lends itself to all the possibilities of regulation and adjustment possessed by the simpler forms already described, but has additional capabilities of its own.

A further mode of control is possible, similar to that employed in a rate-of-climb indicator. The chamber 59 may be variable in volume, as by connecting or disconnecting it, through valves, with one or more separate air chambers. By adjustment of the housing's volume, the rate of pressure change of the cabin can be controlled.

BALANCING OF PRESSURE SUPPLY MEANS WITH THE PRESSURE CONTROL DEVICE

The arrangement of Figure 6 shows the pressure control device as completely independent of the pressure supply device, although the two will be balanced in their design, so that such necessary pressure will be supplied at all altitudes as can be properly controlled by the pressure control device. This particular arrangement contemplates a constant rate of flow, but a variation in the speed of the blower to maintain the flow constant under different pressure conditions. Briefly, the arrangement illustrated in Figure 6 includes a servo piston 93c controlled by a pilot valve 93d and controlling the hydraulic change speed gearing 92. The pilot valve 93d is under the control of a pressure-sensitive device represented as the diaphragm 93e within the casing 93a, subjected on the one side to minus pressure through the tube 95 and on the other side to plus pressure through the tube 94, which pressure difference is a function of flow into or through the cabin. The arrangement is such that regardless of the absolute pressure being maintained in the cabin by its automatic pressure control and regardless of the pressure rise that the blower must maintain to produce that pressure, the blower will be speeded up, as required, to maintain a substantially constant flow of air into the cabin.

In Figure 7 the arrangement is the same as that in Figure 6 except that the lower pressure side of the pressure regulator 93a has connected to it a tube 93b leading from within the cabin. However, this tube 93b is not normally in communication with the plus pressure in the cabin. The plunger 40 is normally interposed as a valve between the cabin pressure and the interior of the tube 93b. The plunger 40, however, has an aperture 40' through which communication may be had between the interior of the tube 93b and the cabin pressure. Such communication occurs when the valve 1, by reason of lowering cabin pressure, approaches closed position, thereby applying the cabin pressure as a plus pressure to the low pressure side of the diaphragm 93e, tending to equalize the pressures on the two sides of this diaphragm, and destroying the low pressure effect on the normally low pressure side, and thereby reacting to adjust the blower control to speed up the blower. Thus cabin pressure is prevented from dropping, and is maintained substantially constant by the speed-up of the blower, and the air supply is balanced against the outflow from the cabin. Any undue increase of cabin pressure can be avoided by normal operation of the pressure control devices, or the interconnection can be so arranged as to decrease the blower's speed correspondingly.

What we claim as our invention is:

1. Mechanism to regulate aircraft cabin pressure comprising a valve movable to control outflow from the cabin and having a stem projecting therefrom, a servo device operatively connected to said stem to effect opening movement of said valve, pressure sensitive means subject to cabin pressure, operable to control the pressure on said servo device and including a rod aligned with said valve stem, manually operable valve closing and locking means including a member engageable with said pressure sensitive means rod and operable to press said rod against said stem in opposition to the action of said pressure sensitive means tending to withdraw said rod from said stem, and further operable to move said valve toward closed position, and securable in position to restrain valve opening movement of said valve stem and pressure sensitive means rod by said servo device, and locking means operatively connected to said manually operable valve closing means and operable to secure such means in valve-closed position.

2. A device to control the pressure within an aircraft cabin, comprising a valve movable to control outflow from the cabin, control means including a pressure sensitive member having a relatively large area of one side subject to cabin pressure, means operable to subject only a relatively small area of its opposite side to a pressure intermediate cabin pressure and ambient atmospheric pressure, varying in accordance with variation in atmospheric pressure, but sustained at a constant value while a given unvarying atmospheric pressure is maintained, to effect movement of said pressure sensitive member by a decrease in atmospheric pressure, which movement is opposed by a decrease in cabin pressure, and valve actuating means operatively connected to said valve and to said pressure sensitive member, and operable to effect progressive closing movement of said valve automatically in response to movement of said pressure sensitive member as the ambient atmospheric pressure decreases, but insufficient closing movement to preserve constant cabin pressure, thus to maintain throughout a substantial altitude range a substantially constant ratio between the drop in cabin pressure and the drop in ambient atmospheric pressure below an initial equalized atmospheric and cabin pressure.

3. A device to control the pressure within an aircraft cabin, comprising a valve movable to control outflow from the cabin, control means including a pressure sensitive member having a relatively large area of one side subject to cabin pressure, means operable to subject only a relatively small area of its opposite side to a pressure intermediate cabin pressure and ambient atmospheric pressure, varying in accordance with variation in atmospheric pressure, but sustained at a constant value while a given unvarying atmospheric pressure is maintained, to effect movement of said pressure sensitive member by a decrease in atmospheric pressure, which movement is opposed by a decrease in cabin pressure, valve actuating means operatively connected to said valve and to said pressure sensitive member, and operable to effect progressive closing movement of said valve automatically in response to movement of said pressure sensitive member as the ambient atmospheric pressure decreases, but insufficient closing movement to preserve constant cabin pressure, thus to maintain throughout a substantial altitude range a substantially constant ratio between the drop in cabin pressure and the drop in ambient atmospheric pressure below an initial equalized atmospheric and cabin pressure, and regulating means movable to adjust said control means to vary the relationship between ambient atmospheric pressures and corresponding sustained pressures acting on said pressure sensitive member intermediate cabin pressure and atmospheric pressure, for altering the degree of displacement of said pressure sensitive member effected and maintained by a given decrease in ambient atmospheric pressure, thus to vary the corresponding alteration in cabin pressure effected and maintained by movement of said valve.

4. A device to control the pressure within an aircraft cabin, comprising a valve movable to control outflow from the cabin, control means including a pressure sensitive member having a relatively large area of one side subject to cabin pressure, means operable to subject only a relatively small area of its opposite side to a pressure intermediate cabin pressure and ambient atmospheric pressure, varying in accordance with variation in atmospheric pressure, but sustained at a constant value while a given unvarying atmospheric pressure is maintained, to effect movement of said pressure sensitive member by a decrease in atmospheric pressure, which movement is opposed by a decrease in cabin pressure, valve actuating means operatively connected to said valve and to said pressure sensitive member, and operable to effect progressive closing movement of said valve automatically in response to movement of said pressure sensitive member as the ambient atmospheric pressure decreases, but insufficient closing movement to preserve constant cabin pressure, thus to maintain throughout a substantial altitude range a substantially constant ratio between the drop in cabin pressure and the drop in ambient atmospheric pressure below an initial equalized atmospheric and cabin pressure, and means operable to adjust said control means to initiate operation of said valve actuating means thereby at a different equalized atmospheric and cabin pressure.

5. A device to control the pressure within an aircraft cabin comprising a valve movable to control outflow from the cabin, valve regulating means operatively connected to said valve, and control means for said valve regulating means including a casing, a diaphragm therein dividing the casing into two chambers and movable to effect actuation of said valve regulating means to move said valve, an evacuated bellows secured to the diaphragm within one casing chamber, and reducing the effective diaphragm area to an annulus which is a given fraction of the total diaphragm area, a port freely open to admit cabin pressure to the other chamber, tending to press said diaphragm in a direction to effect shifting of said valve in a sense to reduce cabin pressure, a spring arranged to oppose such movement of the diaphragm and operable at a predetermined altitude to overcome the air pressure on the cabin pressure side of said diaphragm to effect its movement, and consequently movement of said valve to terminate decrease of cabin pressure at a rate equal to the rate of decrease of ambient atmospheric pressure, a bleed orifice restrictedly admitting air from the cabin to the bellows housing casing chamber, and an orifice for escape of air from the bellows housing casing chamber to the atmosphere to reduce the air pressure on the bellows side of the diaphragm sufficiently to effect its movement, and consequently movement of said valve to decrease cabin pressure at a rate less than the rate of decrease of ambient atmospheric pressure and which is a function of the ratio of the annulus area to the entire diaphragm area, and of the ratio of the area of the bleed orifice to the area of the escape orifice.

6. A pressure control device as defined in claim 5, and means to vary the relative areas of the bleed and escape orifices, to alter the relationship between change of cabin pressure and change of ambient atmospheric pressure.

7. Means to regulate aircraft cabin pressure, comprising a valve movable to control outflow from the cabin, servo valve actuating means operatively connected to move the valve, and means for controlling the pressure within the cabin, including a pressure sensitive device operatively associated with said servo valve actuating means and incorporating a pressure sensitive element having one side exposed to substantially cabin air pressure, a casing enclosing the opposite side of said pressure sensitive element, duct means communicating with said casing and the cabin, for flow of air from the cabin through said casing to a relatively low pressure region, and means operable to vary the flow through said duct means for changing the pressure within said casing to which such opposite side of said pressure sensitive element is subjected, thereby to effect movement of said valve to regulate the cabin pressure.

8. Means to regulate aircraft cabin pressure, comprising a valve movable to control outflow from the cabin, servo valve actuating means operatively connected to move the valve, and control means operatively connected to said servo valve actuating means to open the valve sufficiently to prevent the differential of cabin pressure over external pressure exceeding a selected value, including pressure sensitive means incorporating a pressure sensitive element having one side exposed to substantially cabin air pressure, a casing enclosing the opposite side of said pressure sensitive element, duct means communicating with said casing and the cabin, for flow of air from the cabin through said casing to a region at a pressure less than cabin pressure, and regulating means movable to vary the flow through said duct means for changing the pressure within said casing to which such opposite side of said pressure sensitive element is subjected, thereby to change the selected value of the limiting differential permitted by said control means.

9. A device to control the pressure within an aircraft cabin, comprising a valve movable to control outflow from the cabin, pressure-actuated means having one side subjected to relatively high pressure and an opposite side subjected to relatively low pressure, pressure-sensitive means operable to control the magnitude of the pressure differential created by the relatively high and low pressures acting on the opposite sides of said pressure-actuated means, means operable to subject one surface of said pressure-sensitive means to cabin air pressure, a chamber to which an opposing surface of said pressure-sensitive means is exposed, air flow means connected to said chamber and operable to supply air continuously thereto from a high pressure source, air flow means connected to said chamber and operable to remove air continuously therefrom to atmosphere in accordance with variations in atmospheric pressure, and means operatively connecting said pressure-actuated means and said valve and operable to effect corresponding movement of said valve by said pressure-actuated means upon movement thereof effected by change in pressure thereon produced by said pressure-sensitive means, to maintain throughout a substantial altitude range a substantially constant ratio between the drop in cabin pressure and the drop in ambient atmospheric pressure below an initial equalized atmospheric and cabin pressure.

10. The device to control pressure within an aircraft cabin defined in claim 9, and manual means operable to control at least one of the air flow means for varying the resistance to flow therethrough to alter the pressure in the chamber to which such opposing surface of the pressure-sensitive means is exposed for a given atmospheric pressure.

JAMES B. COOPER.
ALFRED B. JEPSON.

REFERENCES CITED

The following references are of record in the file of this patent:

UNITED STATES PATENTS

| Number | Name | Date |
|---|---|---|
| 1,329,480 | Sherbondy | Feb. 3, 1920 |
| 1,511,489 | Armstrong | Oct. 14, 1924 |
| 1,518,593 | MacBryde | Dec. 9, 1924 |
| 1,562,663 | Strong | Nov. 24, 1925 |
| 1,575,725 | Stewart | Mar. 9, 1926 |
| 1,779,162 | Evers et al. | Oct. 21, 1930 |
| 2,002,057 | Gregg | May 21, 1935 |
| 2,194,937 | Hawkins | Mar. 26, 1940 |
| 2,208,554 | Price | July 16, 1940 |
| 2,225,880 | Montelius | Dec. 24, 1940 |
| 2,228,315 | Hutton | Jan. 14, 1941 |
| 2,307,199 | Cooper | Jan. 5, 1943 |
| 2,316,416 | Gregg | Apr. 13, 1943 |
| 2,342,220 | Price | Feb. 22, 1944 |
| 2,391,197 | Schwein | Dec. 18, 1945 |
| 2,419,707 | Cooper et al. | Apr. 29, 1947 |

FOREIGN PATENTS

| Number | Country | Date |
|---|---|---|
| 149,709 | Great Britain (Stout) | Aug. 17, 1920 |
| 521,623 | Great Britain | May 27, 1940 |
| 679,386 | France (Anciens) | Apr. 11, 1930 |

OTHER REFERENCES

Article, "Pressurized Cabin Control," Tinker and Hubbard, published in "Aviation," Jan. 1941, pages 38, 199 and 124.